US011056329B2

(12) United States Patent
Dovichi et al.

(10) Patent No.: US 11,056,329 B2
(45) Date of Patent: Jul. 6, 2021

(54) ESI-MS VIA AN ELECTROKINETICALLY PUMPED INTERFACE

(71) Applicant: University of Notre Dame du Lac, South Bend, IN (US)

(72) Inventors: Norman Dovichi, South Bend, IN (US); Scott Sarver, South Bend, IN (US); Nicole Schiavone, South Bend, IN (US); Zhenbin Zhang, South Bend, IN (US); Liangliang Sun, South Bend, IN (US)

(73) Assignee: University of Notre Dame du Lac, South Bend, IN (US)

( * ) Notice: Subject to any disclaimer, the term of this patent is extended or adjusted under 35 U.S.C. 154(b) by 373 days.

(21) Appl. No.: 16/067,032

(22) PCT Filed: Dec. 30, 2016

(86) PCT No.: PCT/US2016/069504
§ 371 (c)(1),
(2) Date: Jun. 28, 2018

(87) PCT Pub. No.: WO2017/117533
PCT Pub. Date: Jul. 6, 2017

(65) Prior Publication Data
US 2020/0273693 A1  Aug. 27, 2020

Related U.S. Application Data

(60) Provisional application No. 62/274,097, filed on Dec. 31, 2015.

(51) Int. Cl.
*G01N 27/447* (2006.01)
*H01J 49/16* (2006.01)
*G01N 30/72* (2006.01)

(52) U.S. Cl.
CPC ........ *H01J 49/167* (2013.01); *G01N 27/4473* (2013.01); *G01N 30/7266* (2013.01)

(58) Field of Classification Search
CPC .......... G01N 30/7266; G01N 27/4473; G01N 27/447; G01N 30/72; H01J 49/167
See application file for complete search history.

(56) References Cited

U.S. PATENT DOCUMENTS 4,997,537 A     3/1991  Karger et al.
5,423,964 A  *  6/1995  Smith .............. G01N 27/44717
                                                     204/452

(Continued)

FOREIGN PATENT DOCUMENTS

CN    103545166 A    1/2016
JP    H10221305 A    8/1998
WO    2015031820 A1  3/2015

OTHER PUBLICATIONS

Razunguzwa, Trust T., Manoj Warrier, and Aaron T. Timperman. "ESI-MS compatible permanent coating of glass surfaces using poly (ethylene glycol)-terminated alkoxysilanes for capillary zone electrophoretic protein separations." Analytical chemistry 78.13 (2006): 4326-4333 (Year: 2006).*

(Continued)

*Primary Examiner* — Wyatt A Stoffa
(74) *Attorney, Agent, or Firm* — Haukaas Fortius PLLC; Michael H. Haukaas

(57) ABSTRACT

An electrokinetically pumped sheath flow nanospray interface for capillary electrophoresis coupled to negative mode electrospray mass spectrometer is described. At this interface, application of an electric field generates electro-osmotic flow at the interior of a glass emitter having an orifice. Electroosmotic flow pumps liquid around the distal tip of the separation capillary, ensheathing analyte into the electrospray electrolyte. In negative ion mode, negative potential (Continued)

applied to an untreated emitter drives sheath flow away from the emitter orifice, decreasing the stability and efficiency of the spray. In contrast, when the interior of the electrospray emitter is grafted with aminoalkylsilanes, the amines have a positive charge, which reverses electroosmosis and generates stable sheath flow to the emitter orifice under negative potential. Limits of detection were about 150 to 900 attomoles injected. Negative mode operation was demonstrated by analyzing a metabolite extract from stage 1 *Xenopus laevis* embryos.

23 Claims, 4 Drawing Sheets

(56) References Cited

U.S. PATENT DOCUMENTS

| | | | |
|---|---|---|---|
| 5,503,722 A | 4/1996 | Guttman | |
| 5,993,633 A * | 11/1999 | Smith | G01N 27/44717 204/450 |
| 6,670,607 B2 * | 12/2003 | Wood | H01J 49/167 250/288 |
| 7,303,821 B1 | 12/2007 | Huang | |
| 9,543,137 B2 * | 1/2017 | Apffel | G01N 35/08 |
| 2003/0047680 A1 | 3/2003 | Figeys et al. | |
| 2004/0045828 A1 | 3/2004 | Ratnayake et al. | |
| 2005/0233399 A1 | 10/2005 | Aebersold et al. | |
| 2005/0249882 A1 | 11/2005 | Liu et al. | |
| 2012/0000780 A1 | 1/2012 | Chiesl et al. | |
| 2013/0140180 A1 * | 6/2013 | Dovichi | G01N 27/44717 204/451 |
| 2014/0158233 A1 | 6/2014 | Leslie et al. | |
| 2014/0209461 A1 | 7/2014 | Lau | |
| 2015/0311056 A1 * | 10/2015 | Dovichi | G01N 30/7266 250/282 |
| 2015/0340219 A1 * | 11/2015 | Mellors | H01J 49/26 250/288 |
| 2017/0097320 A1 * | 4/2017 | Britz-McKibbin | G01N 27/44782 |
| 2020/0110055 A1 * | 4/2020 | Gentalen | B01L 3/502715 |
| 2020/0256836 A1 * | 8/2020 | Vorm | B29C 45/14426 |

OTHER PUBLICATIONS

Huhn C., et al., Relevance and use of capillary coatings in capillary electrophoresis-mass spectrometry, Anal Bioanal Chem (Oct. 2009), 396:297-314.

UltraTrol Product Technical Guide, Jan. 1, 2004, retrieved from internet: http://targetdiscovery.com/ultratrol/, 6 pages.

Ali et al., "Open Tubular Capillary Electrochromatography with an N-Phenylacrylamide-Styrene Copolymer-Based Stationary Phase for the Separation of Anomers of Glucose and Structural Isomers of Maltotriose," J Sep Sci., 38(10):1763-1770, May 2015.

Buszewski et al., "Separation of Bacteria by Capillary Electrophoresis," J. Sep. Sci., 26(11):1045-1049, Jul. 2003.

Doherty et al., "Microchannel Wall Coatings for Protein Separations by Capillary and Chip Electrophoresis," Electrophoresis, 24(1-2):34-54, Jan. 2003.

Horvath et al., "Polymer Wall Coatings for Capillary Electrophoresis," Electrophoresis, 22(4):644-655, Feb. 2001.

Huang et al., "Surface-Confined Living Radical Polymerization for Coatings in Capillary Electrophoresis," Anal. Chem., 70(19):4023-4029, Aug. 1998.

Li et al., "Quantitative Multiple Reaction Monitoring of Peptide Abundance Introduced via a Capillary Zone Electrophoresis-Electrospray Interface," Anal Chem., 84(14):6116-6121, Jul. 2012.

Liu et al., "Poly(diallyldimethylammonium chloride) as a Cationic Coating for Capillary Electrophoresis," J Chromatogr Sci., 36:126-130, Mar. 1997.

Moini, M., "Simplifying CE-MS Operation. 2. Interfacing Low-Flow Separation Techniques to Mass Spectrometry Using a Porous Tip," Anal. Chem., 79:4241-4246, Jun. 2007.

Ramsay et al., "Capillary Isoelectric Focusing with ph 9.7 Cathode for the Analysis of Gastric Biopsies," Anal Bioanal Chem., 400(7):2025-2030, Jun. 2011.

Righetti et al., "Capillary Electrophoresis and Isoelectric Focusing in Peptide and Protein Analysis," Proteomics, 13(2):325-340, Jan. 2013.

Sun et al., "Capillary Zone Electrophoresis for Analysis of Complex Proteomes Using an Electrokinetically Pumped Sneath Flow Nanospray Interface," Proteomics,14(4-5), pp. 1-7, Mar. 2014.

Sun et al., "CZE-ESI-MS/MS System for Analysis of Subnanogram Amounts of Tryptic Digests of a Cellular Homogenate," Proteomics, 12(0):3013-3019, Oct. 2012.

Sun et al., "Fast Top-Down Intact Protein Characterization with Capillary Zone Electrophoresis-Electrospray Ionization Tandem Mass Spectrometry," Anal Chem., 85(12):5989-5995, Jun. 2013.

Sun et al., "Integrated Capillary Zone Electrophoresis-Electrospray Ionization Tandem Mass Spectrometry System with an Immobilized Trypsin Microreactor for Online Digestion and Analysis of Picogram Amounts of RAW 264.7 Cell Lysate," Anal. Chem., 85(8):4187-4194, Mar. 2013.

Whitt et al., "Capillary Electrophoresis to Mass Spectrometry Interface Using a Porous Junction," Anal. Chem., 75(9):2188-2191, Apr. 2003.

Wojcik, et al., "Simplified Capillary Electrophoresis Nanospray Sheath-Flow Interface for High Efficiency and Sensitive Peptide Analysis," Rapid Commun Mass Spectrom., 24(17):2554-2560, Sep. 2010.

Zhu, et al., "Thermally-Initiated Free Radical Polymerization for Reproducible Production of Stable Linear 2 Polyacrylamide Coated Capillaries, and Their Application to Proteomic Analysis Using Capillary Zone Electrophoresis-Mass Spectrometry", Talanta, 146:839-843, Jan. 2016.

* cited by examiner

ESI-MS VIA AN ELECTROKINETICALLY PUMPED INTERFACE

RELATED APPLICATIONS

This application is a National Stage filing under 35 U.S.C. § 371 of International Application No. PCT/US2016/069504 filed Dec. 30, 2016, which claims priority under 35 U.S.C. § 119(e) to U.S. Provisional Patent Application No. 62/274,097, filed Dec. 31, 2015, which applications are incorporated herein by reference.

GOVERNMENT SUPPORT

This invention was made with government support under Grant No. R01 GM096767 awarded by the National Institutes of Health. The government has certain rights in the invention.

BACKGROUND OF THE INVENTION

Electrospray ionization (ESI) has been crucial to the analysis of biomolecules since its introduction as an ionization technique for mass spectrometry (MS). Coupling high resolution separation techniques such as high performance liquid chromatography (HPLC) and capillary electrophoresis (CZE) to mass spectrometry through an ESI interface allows for the analysis of highly complex mixtures frequently encountered in proteomics and metabolomics. CZE coupled by electrospray to tandem mass spectrometry is a recently developed powerful alternative to nano-LCMS for the analysis of biological samples. The electrospray interface is key to the performance of the system; it must control the potential at the distal end of the separation capillary while simultaneously driving electrospray.

There are at least three classes of capillary electrophoresis-electrospray interfaces. A commercial interface from Agilent resembles a conventional HPLC electrospray interface. It uses a mechanically pumped sheath liquid and nebulizing gas. The sheath liquid provides electrical connection to the separation capillary while supporting electrospray. This interface should be very robust, but can suffer from high dilution due to use of relatively high sheath flow rates.

A second interface eliminates a sheath liquid by making electrical contact to the interior of the separation capillary through a small portion of the capillary wall itself. The distal tip of the capillary is etched to create a very thin wall with sufficient conductivity to drive electrophoresis. The outer surface of the etched capillary wall is in contact with an electrolyte that is held at the electrospray voltage. The system also does not employ a sheath gas, but often employs pressure-driven flow to supplement the electrokinetic transport of analyte through the capillary. Acidic electrolytes containing organic solvents, such as methanol or acetonitrile, are often used and occasionally a low pressure is applied to the proximal end of the capillary to pump electrolyte through the capillary during electrophoresis.

A third interface employs electrokinetically-driven sheath-flow to generate a stable nanospray. The interface uses a glass emitter that is filled with an electrolyte and, like the previous interface, does not employ a nebulizing gas. The silicate groups on the interior of the emitter carry a negative charge under most conditions. Application of an electric field generates electro-osmotic flow that acts as a very stable pump in the nL/min regime. The direction and rate of flow depend on the applied potential and on the surface charge of the emitter. Under positive potential with respect to the mass spectrometer and with an untreated glass emitter, electro-osmosis is directed toward the emitter orifice, producing a stable electrospray. Under negative potential and an untreated glass emitter, flow is directed away from the emitter orifice, producing unstable electrospray.

Negative-ion electrospray is valuable in analysis of a number of analytes and requires application of a negative potential to the emitter. However, to generate stable electrospray, the surface chemistry of the emitter needs to be modified to ensure electro-osmotic flow is directed to the emitter orifice in electrospray under negative ion operation, thereby producing stable flow with reasonable sensitivity. Accordingly, a technological solution to address this issue would advance the art of mass spectrometry and electrophoresis.

SUMMARY

We demonstrate the first electrokinetically pumped sheath flow interface for capillary electrophoresis (CE) coupled to negative mode electrospray ionization-mass spectrometry (ESIMS). In this interface, application of an electric field generates electroosmotic flow at the interior of a glass emitter (~10 μm inner diameter orifice). This electroosmotic flow pumps sheath liquid around the distal tip of the separation capillary, drawing analyte into the electrospray. In positive ion mode, positive potential is applied to the emitter with respect to the grounded mass spectrometer entrance orifice. This positive potential interacts with the negatively charged silanol groups on the glass surface to generate flow towards the emitter orifice. In contrast, in negative ion mode, the negative potential applied to the emitter drives sheath flow away from the emitter orifice, decreasing the stability and efficiency of the spray. In this disclosure, we have treated a portion of the interior of the electrospray emitter with an appropriate chemical to reverse electroosmosis and drive sheath flow to the emitter orifice. The capability of the interface is demonstrated by analyzing a mixture of amino acid standards on the Thermo QExactive HF mass spectrometer. A linear calibration curve was generated across three orders of magnitude with injection amounts as small as 330 attomoles. Limits of detection (LOD) were between 150 and 900 attomoles of injected sample. The stability and linear response with concentration demonstrate the improved performance afforded by the treated emitter interface.

Accordingly, this disclosure provides an apparatus for an electrospray ionization interface for a mass spectrometer comprising:

a glass emitter for electroosmotic flow (EOF) of a sheath-liquid in negative mode, wherein the glass emitter's surface comprises a coating of one or more organic chemicals covalently bonded to the surface wherein the organic chemicals comprise one or more functional moieties (e.g., that allow for the formation of a positive charge on the moiety upon subjecting to an electrospray voltage); and an inlet for a sheath liquid;

wherein when an electrospray voltage is applied to a sheath liquid introduced to the glass emitter, positive charges formed on the functional moieties stabilize the direction of the EOF in negative mode.

The emitter for an electrospray ionization-mass spectrometer (ESI-MS) can also comprise:

a hollow cylinder having an orifice at a distal end, wherein the inner diameter of the orifice is smaller than the inner diameter of the cylinder body and the surface of the emitter comprises a coating of one or more organic chemicals covalently bonded to the surface wherein the organic chemicals comprise one or more functional moieties; and a union to the emitter and an inlet for a sheath liquid;

wherein when a negative mode electrospray voltage is applied to the sheath liquid introduced to the emitter, positive charges formed on the functional moieties stabilize the direction of electroosmotic flow (EOF) of the sheath liquid toward the orifice, and an ionized electrospray is formed as the sheath liquid exits the orifice.

This disclosure also provides a method for adapting a glass emitter for a negative mode electrospray ionization-mass spectrometer (ESI-MS) comprising:

covalently bonding organic chemicals having functional moieties to the surface of a glass emitter, wherein the glass emitter is a hollow cylinder comprising an orifice at a distal end and the inner diameter of the orifice is smaller than the inner diameter of the cylinder body; and interfacing the glass emitter and a separation capillary to a mass spectrometer, wherein a mixture of one or more analytes in a separation background electrolyte are separated in the capillary;

wherein when a negative mode electrospray voltage is applied to a sheath liquid introduced to the emitter, positive charges form on the functional moieties to stabilize the direction of electroosmotic flow (EOF) of the sheath liquid toward the orifice, and the analytes exiting the capillary are transported toward the orifice by the EOF around the distal tip of the capillary, wherein an ionized electrospray is formed as the sheath liquid and the analytes exit the orifice.

Additionally, this disclosure provides an ESI-MS analytical method for analyzing a sample comprising:

i) interfacing a mass spectrometer to a) the emitter and the sheath liquid inlet described herein and b) a separation capillary wherein a mixture of one or more analytes in a separation background electrolyte are separated in the capillary;

wherein when a negative mode electrospray voltage is applied to a sheath liquid introduced to the emitter via the inlet, the analytes exiting the capillary are transported toward the orifice by the stable EOF of the sheath liquid around the distal tip of the capillary, thereby producing a stabilized electrospray as the sheath liquid and the analytes exit the orifice and subsequently enter the mass spectrometer, and ii) analyzing the sample by mass spectroscopy with a limit of detection below about 1 femtomole.

BRIEF DESCRIPTION OF THE DRAWINGS

The following drawings form part of the specification and are included to further demonstrate certain embodiments or various aspects of the invention. In some instances, embodiments of the invention can be best understood by referring to the accompanying drawings in combination with the detailed description presented herein. The description and accompanying drawings may highlight a certain specific example, or a certain aspect of the invention. However, one skilled in the art will understand that portions of the example or aspect may be used in combination with other examples or aspects of the invention.

DETAILED DESCRIPTION

Figure 1:
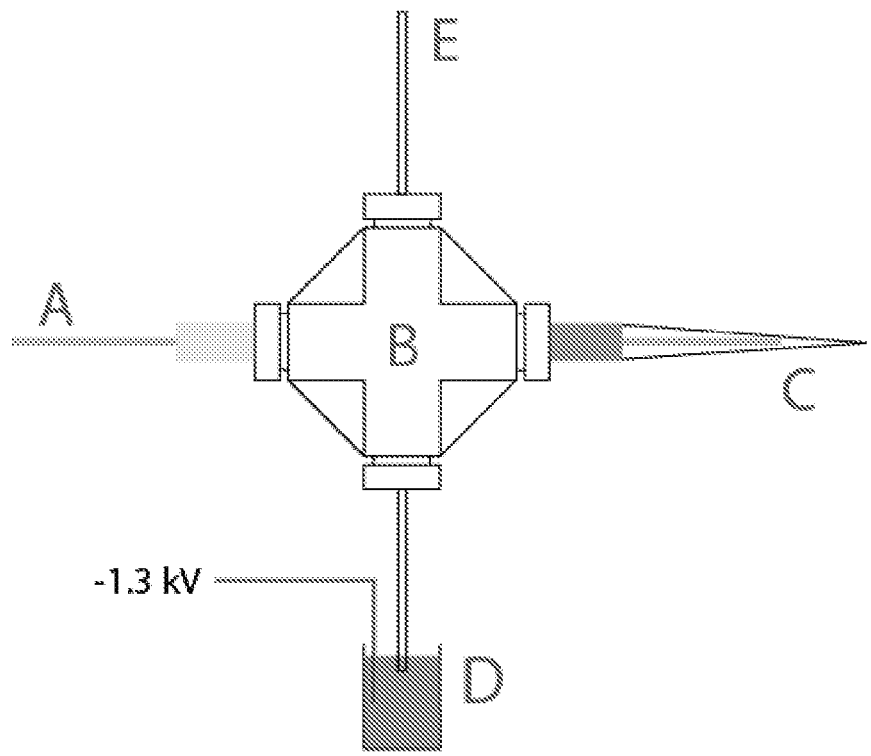
FIG. 1. Diagram of a CEMS interface for negative mode ESI (top image) and a schematic of a glass emitter (bottom image), according to an embodiment. Top image: (A) Separation capillary was filled with background electrolyte (BGE) and threaded through a sleeve into a 4-way PEEK union (B). (C) An amino-coated borosilicate glass emitter was fitted into a sleeve and attached to the 4-way union, and the separation capillary was threaded into the emitter tip. (D) Electrospray voltage was applied to spray buffer in a vial. The electrospray voltage also drives EOF in the emitter toward the opening of the emitter and inlet of the mass spectrometer. (E) A syringe containing spray buffer was attached to the final opening of the 4-way union to replenish spray buffer in the vial and remove air bubbles. Details of the glass emitter (bottom image). Cationic sites on the emitter wall attract anions that form an electrical double layer. The electrospray potential drives these anions to the emitter tip; the anions drag buffer with them, creating electroosmotic flow. This electroosmotic flow ensheaths the sample stream as it exits the separation capillary. Electrospray was generated as the solution exits the emitter.
Figure 1:
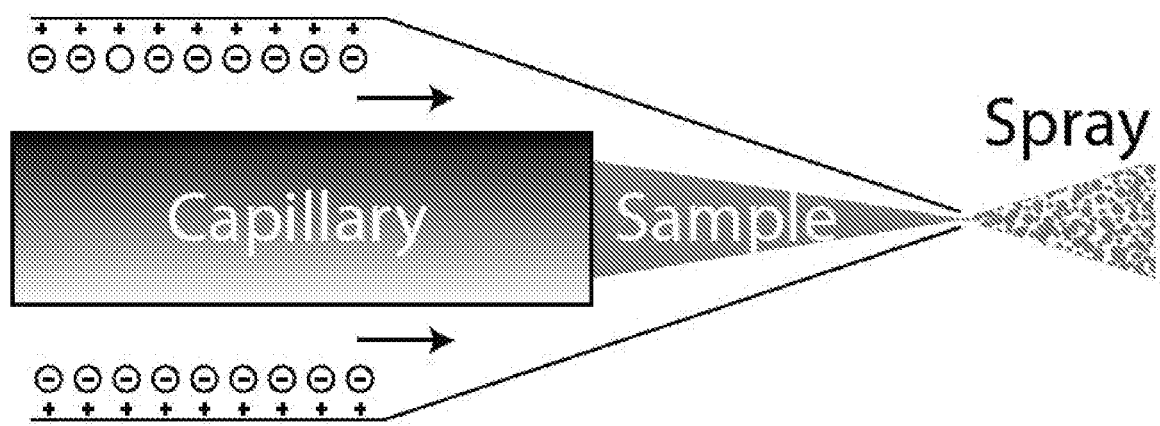

Combination of a basic spray electrolyte with an uncoated emitter results in the rapid onset of discharge and destruction of the emitter. To produce stable electrospray in negative ion mode, it appears necessary to control the surface chemistry in the emitter so that electro-osmotic flow is directed toward the orifice upon application of negative potential. This flow requires a positively charged emitter surface with a concomitant negatively charged double-layer. We generated a positively charged emitter surface by first treating the interior of a borosilicate tube with aminopropyltrimethoxysilane, and then pulling the tube to a narrow tip with a heated pipet puller. During the pulling process, most of the emitter's interior surface is not heated and the aminopropyltrimethoxysilane coating in this region survives. This coated portion of the emitter generates electro-osmosis towards the emitter orifice.

Definitions

The following definitions are included to provide a clear and consistent understanding of the specification and claims. As used herein, the recited terms have the following meanings. All other terms and phrases used in this specification have their ordinary meanings as one of skill in the art would understand. Such ordinary meanings may be obtained by reference to technical dictionaries, such as *Hawley's Condensed Chemical Dictionary* 14th Edition, by R. J. Lewis, John Wiley & Sons, New York, N.Y., 2001.

References in the specification to "one embodiment", "an embodiment", etc., indicate that the embodiment described may include a particular aspect, feature, structure, moiety, or characteristic, but not every embodiment necessarily includes that aspect, feature, structure, moiety, or characteristic. Moreover, such phrases may, but do not necessarily, refer to the same embodiment referred to in other portions of the specification. Further, when a particular aspect, feature, structure, moiety, or characteristic is described in connection with an embodiment, it is within the knowledge of one skilled in the art to affect or connect such aspect, feature, structure, moiety, or characteristic with other embodiments, whether or not explicitly described.

The singular forms "a," "an," and "the" include plural reference unless the context clearly dictates otherwise. Thus, for example, a reference to "a compound" includes a plurality of such compounds, so that a compound X includes a plurality of compounds X. It is further noted that the claims may be drafted to exclude any optional element. As such, this statement is intended to serve as antecedent basis for the use of exclusive terminology, such as "solely," "only," and the like, in connection with any element described herein, and/or the recitation of claim elements or use of "negative" limitations.

The term "and/or" means any one of the items, any combination of the items, or all of the items with which this term is associated. The phrases "one or more" and "at least one" are readily understood by one of skill in the art, particularly when read in context of its usage. For example, the phrase can mean one, two, three, four, five, six, ten, 100, or any upper limit approximately 10, 100, or 1000 times higher than a recited lower limit.

The terms "about" and "approximately" are used interchangeably. Both terms can refer to a variation of ±5%, ±10%, ±20%, or ±25% of the value specified. For example, "about 50" percent can in some embodiments carry a variation from 45 to 55 percent, or as otherwise defined by a particular claim. For integer ranges, the term "about" can include one or two integers greater than and/or less than a recited integer at each end of the range. Unless indicated otherwise herein, the terms "about" and "approximately" are intended to include values, e.g., weight percentages, proximate to the recited range that are equivalent in terms of the functionality of the individual ingredient, composition, or embodiment. The terms "about" and "approximately" can also modify the end-points of a recited range as discussed above in this paragraph.

As will be understood by the skilled artisan, all numbers, including those expressing quantities of ingredients, properties such as molecular weight, reaction conditions, and so forth, are approximations and are understood as being optionally modified in all instances by the term "about." These values can vary depending upon the desired properties sought to be obtained by those skilled in the art utilizing the teachings of the descriptions herein. It is also understood that such values inherently contain variability necessarily resulting from the standard deviations found in their respective testing measurements. When values are expressed as approximations, by use of the antecedent "about," it will be understood that the particular value without the modifier "about" also forms a further aspect.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. It is therefore understood that each unit between two particular units are also disclosed. For example, if 10 to 15 is disclosed, then 11, 12, 13, and 14 are also disclosed, individually, and as part of a range. A recited range (e.g., weight percentages or carbon groups) includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc. As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio. Accordingly, specific values recited for radicals, substituents, and ranges, are for illustration only; they do not exclude other defined values or other values within defined ranges for radicals and substituents. It will be further understood that the endpoints of each of the ranges are significant both in relation to the other endpoint, and independently of the other endpoint.

One skilled in the art will also readily recognize that where members are grouped together in a common manner, such as in a Markush group, the invention encompasses not only the entire group listed as a whole, but each member of the group individually and all possible subgroups of the main group. Additionally, for all purposes, the invention encompasses not only the main group, but also the main group absent one or more of the group members. The invention therefore envisages the explicit exclusion of any one or more of members of a recited group. Accordingly, provisos may apply to any of the disclosed categories or embodiments whereby any one or more of the recited elements, species, or embodiments, may be excluded from such categories or embodiments, for example, for use in an explicit negative limitation.

The term "contacting" refers to the act of touching, making contact, or of bringing to immediate or close proximity, including at the cellular or molecular level, for example, to bring about a physiological reaction, a chemical reaction, or a physical change, e.g., in a solution, in a reaction mixture, in vitro, or in vivo.

An "effective amount" refers to an amount effective to bring about a recited effect, such as an amount necessary to form products in a reaction mixture. Determination of an effective amount is typically within the capacity of persons skilled in the art, especially in light of the detailed disclosure provided herein. The term "effective amount" is intended to include an amount of a compound or reagent described herein, or an amount of a combination of compounds or reagents described herein, e.g., that is effective to form products in a reaction mixture. Thus, an "effective amount" generally means an amount that provides the desired effect.

The term "substantially" as used herein, is a broad term and is used in its ordinary sense, including, without limitation, being largely but not necessarily wholly that which is specified.

The term "organic chemical" means a class of chemicals containing carbon and hydrogen and may comprise other atoms, for example but not limited to nitrogen, oxygen, sulfur, silicon, and halogen (for example, fluorine, chlorine, bromine, and iodine). The organic chemicals in this disclosure also comprise functional groups that are substituents on the carbon-based (organic chemical) framework. For example, the organic chemical can be an alkyl hydrocarbon of 1 to about 20 carbon atoms which can be a substantially linear chain of carbon atoms, which may also be branched, or the said alkyl hydrocarbon may be cyclic such as cyclopropane, cyclopentane or cyclohexane. Examples of functional groups can be, but are not limited to primary amines, secondary amines, tertiary amines, amides, and esters. Functional groups can be further functionalized by other functional groups. The functional groups in this disclosure serve the purpose of carrying a charge to stabilize electroosmotic flow toward the emitter orifice in negative electrospray mode, for example an amine functional group can be protonated to have a positive charge. The functional group can also include silicon for linking the organic chemical to a surface. The surface can be glass having silanol moieties which can be covalently bonded to the organic chemical's silicon moiety. The organic chemical which is reacted with silanol moieties can have a reactive functional group such as a halogen or an alkoxy (e.g., methoxy). For example, the methoxy moiety in the reagent 3-aminopropyltrimethoxysilane will react with silanol on the surface of glass under suitable reaction conditions known to an individual skilled in the art. There is a large but limited number of small organic chemicals (e.g., having a M.W. less than about 1000 Daltons) that have two or more functional groups on a carbon framework wherein one of the functional groups can carry a charge and another functional group on the organic chemical can be covalently linked to, for example, a glass surface.

The term "metabolized compound" means a chemical substance which has been chemically altered in a living organism through the process of metabolism.

Embodiments of the Invention

In a first embodiment of the disclosure, an electrospray ionization interface for a mass spectrometer comprises:

a glass emitter for electroosmotic flow (EOF) of a sheath-liquid in negative mode, wherein the glass emitter's surface comprises a coating of one or more organic chemicals covalently bonded to the surface wherein the organic chemicals comprise one or more functional moieties, and an inlet for a sheath liquid, wherein when an electrospray voltage is applied to a sheath liquid introduced to the glass emitter, positive charges formed on the functional moieties stabilize the direction of the EOF in negative mode.

In various embodiments, the glass emitter is a hollow cylinder comprising an orifice at a distal end and the inner diameter of the orifice is smaller than the inner diameter of the cylinder body, wherein the EOF of the sheath liquid traverses in a direction toward the orifice and an ionized electrospray is formed as the sheath liquid exits the orifice.

In other embodiments, less than a whole portion of the glass emitter comprises the functional moieties. In additional embodiments, the emitter comprises borosilicate glass coated completely, substantially, or partially by one or more of the functional moieties. In yet other embodiments, about 10% to about 90%, 20% to about 80%, or 30% to about 70% of the surface emitter is coated by one or more of the functional moieties. In various other embodiments, the organic chemicals that are covalently bonded to the surface of the emitter comprise an organoamine, such as an aminoalkyl moiety.

In various embodiments, the interface comprises a separation capillary, the capillary comprising a separation background electrolyte wherein one or more analytes in a mixture of the separation background electrolyte are separated in the capillary and the analytes exiting the capillary are transported toward the orifice by the EOF of the sheath liquid around the distal tip of the separation capillary.

In another embodiment, the inner diameter of the glass emitter orifice is about 5 µm to about 50 µm, about 5 µm to about 30 µm, about 15 µm to about 35 µm, about 15 µm to about 20 µm or about 10 m to about 25 µm. In various other embodiments of the glass emitter, the functional groups substantially prevent EOF in the direction opposite to the emitter orifice thereby minimizing fluctuations in electrospray intensity.

Embodiments of this disclosure include minimized fluctuations in electrospray intensity of the ionized electrospray exiting the glass emitter affords a limit of detection of an analyte below about 1 femtomole, or below about 900 attomoles. In additional embodiments, the limit of detection of an analyte can be about 150 to about 900 attomoles.

The intensity of the ionized electrospray background signal exiting the emitter orifice is stabilized by the coated emitter to less than about $\pm 2 \times 10^4$ intensity units, less than about $\pm 1 \times 10^4$ intensity units, or less than about $\pm 0.1 \times 10^4$ intensity units. Thus, the variability of the baseline in an electropherogram when using the coated emitter can be reduced by at least a factor of 10, by at least a factor of 20, or by at least a factor of 30 (see FIG. 2). Furthermore, the coated emitter allows for the production of a signal in an electropherogram where the base peak of an analyte is at least 30, at least 50, or at least 70 times greater in terms of intensity units compared to the background noise (baseline) of the electropherogram.

This disclosure encompasses a second embodiment of an emitter for an electrospray ionization-mass spectrometer (ESI-MS) comprising:

a hollow cylinder having an orifice at a distal end, wherein the inner diameter of the orifice is smaller than the inner diameter of the cylinder body and the surface of the emitter comprises a coating of one or more organic chemicals covalently bonded to the surface wherein the organic chemicals comprise one or more functional moieties; and a union to the emitter and an inlet for a sheath liquid;

wherein when a negative mode electrospray voltage is applied to the sheath liquid introduced to the emitter, positive charges formed on the functional moieties stabilize the direction of electroosmotic flow (EOF) of the sheath liquid toward the orifice, and an ionized electrospray is formed as the sheath liquid exits the orifice.

A third embodiment encompasses a method for adapting a glass emitter for a negative mode electrospray ionization-mass spectrometer (ESI-MS) comprising:

covalently bonding organic chemicals having functional moieties to the surface of a glass emitter, wherein the glass emitter is a hollow cylinder comprising an orifice at a distal end and the inner diameter of the orifice is smaller than the inner diameter of the cylinder body; and interfacing the glass emitter and a separation capillary to a mass spectrometer, wherein a mixture of one or more analytes in a separation background electrolyte are separated in the capillary;

wherein when a negative mode electrospray voltage is applied to a sheath liquid introduced to the emitter, positive charges form on the functional moieties to stabilize the direction of electroosmotic flow (EOF) of the sheath liquid toward the orifice, and the analytes exiting the capillary are transported toward the orifice by the EOF around the distal tip of the capillary, wherein an ionized electrospray is formed as the sheath liquid and the analytes exit the orifice.

In various embodiments, the aminoalkylsilane is covalently bonded to the surface of the glass emitter, and wherein the amino moieties of the aminoalkylsilane are positively charged. In another embodiment, the inner diameter of the glass emitter orifice can be about 10 μm to about 25 μm, or about 15 μm to about 20 μm. In other embodiments, the stabilized EOF produces a stable electrospray. Yet in various embodiments, the limit of detection is below about 2 femtomole, 1 femtomole, 0.5 femtomole, or about 0.25 femtomole.

A fourth embodiment encompasses an ESI-MS analytical method for analyzing a sample comprising:
i) interfacing a mass spectrometer to a) an emitter and sheath liquid inlet as described herein and b) a separation capillary wherein a mixture of one or more analytes in a separation background electrolyte are separated in the capillary;
wherein when a negative mode electrospray voltage is applied to a sheath liquid introduced to the emitter via the inlet, the analytes exiting the capillary are transported toward the orifice by the stable EOF of the sheath liquid around the distal tip of the capillary, thereby producing a stabilized electrospray as the sheath liquid and the analytes exit the orifice and subsequently enter the mass spectrometer, and ii) analyzing the sample by mass spectroscopy with a level of detection below about 2 femtomole, about 1 femtomole, or about 0.5 femtomole.

In various embodiments, the analytes in a sample are separated by capillary zone electrophoresis (CZE). The samples can include one or more proteins, one or more carbohydrates, one or more metabolized compounds, one or more compounds comprising an amine moiety, one or more compounds comprising a negatively ionizable functional group (for example, a carboxylic acid will form a carboxylate ion in negative mode), or a combination thereof. In some embodiments, the sample includes one or more lipids, one or more carbohydrates, one or more metabolized compounds, or a combination thereof. In various embodiments, the samples analyzed can include nucleotides, nucleosides, or glycans. The glycans can be peptidoglycans or glycans of antibodies, for example, recombinant antibodies, including sialic acid-containing antibodies. Any combination of the analytes discussed above can be detected by the methods described herein.

In various embodiments, a separation background electrolyte for CZE and the sheath liquid do not contain organic additives. In further embodiments, high flow rates of the sheath liquid or high flow rates of an electrospray buffer do not substantially decrease the limit of detection.

Figure 6:
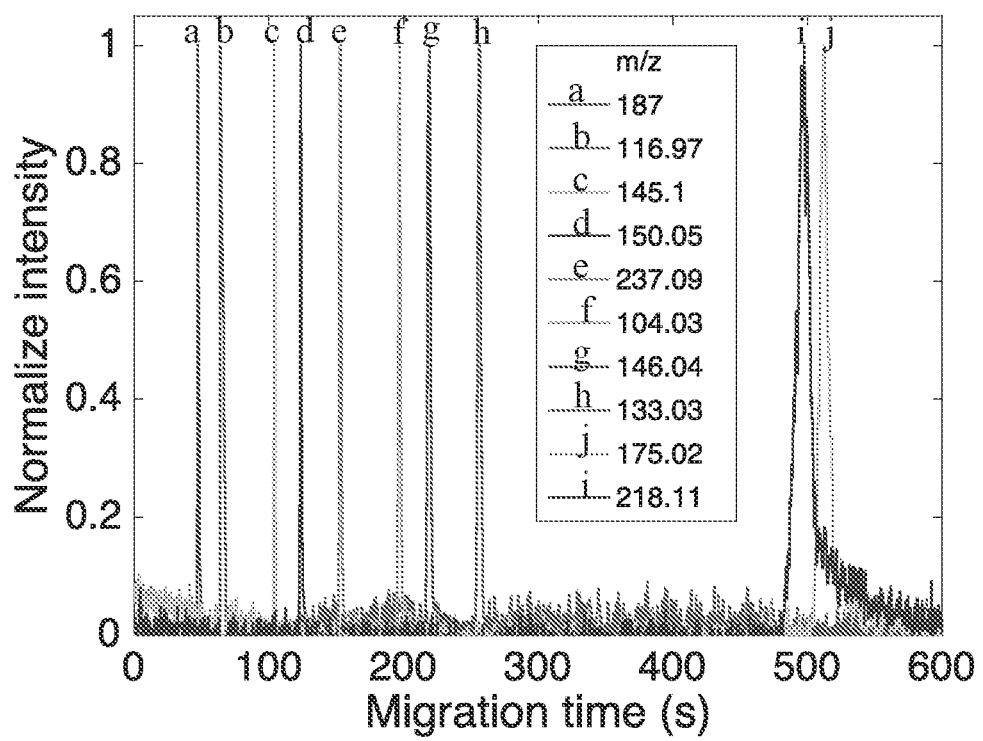
FIG. 6. Normalized extracted ion electropherogram generated from the metabolites extracted from stage 1 *Xenopus laevis* embryos. The electropherograms were treated with a three-point median filter followed by a first order Lowess filter with a span of 10.

We performed an evaluation of the interface by analysis of the metabolites extracted from stage 1 *Xenopus laevis* embryos. Over 100 features were manually identified in the data. The median peak width was 1.3 seconds, and the average number of theoretical plates was 15,000, presumably limited by the relatively large injection volume used in the experiment. FIG. 6 presents selected ion electropherograms for 10 features.

In brief, our emitter has covalently grafted amines at the interior of the glass emitter used in an electrokinetically-pumped sheath flow nanospray interface. These amines generate a negatively charged double layer that moves towards the emitter orifice during negative mode operation. This system was evaluated by performing capillary zone electrophoresis on metabolites isolated from stage 1 *Xenopus laevis* embryos. Over 100 features were detected in negative mode.

Capillary Electrophoresis Coupled to Negative Mode ESI-MS by an Electrokinetically Pumped Interface We have developed a sheath flow interface for CZE-MS that operates in the nanoflow regime. The interface (FIG. 1) uses a glass emitter that was filled with an electrolyte. The silicate groups on the interior of the emitter carry a charge and under an applied electric field, electroosmosis acts as a very stable pump in the nL/min regime. The isoelectric point of silicate groups, pI, is less than 2, and under most conditions, the silicate groups are deprotonated, generating anionic groups on the glass surface and a cloud of cations in solution near the glass wall. Application of an electric field propels the cations from the positive to the negative electrode at low nL/min rates. In this flow regime, analyte dilution is negligible as it exits the distal end of the capillary. Addition of organics, such as methanol or acetonitrile, to the sheath liquid is a convenient means of stabilizing the electrospray without the need to modify the separation electrolyte.

Modern proteomic workflows generally perform electrospray in the positive ionization mode, and our interface has seen rapid optimization for use in positive ionization mode. However, many analyte classes ionize better and have more published fragmentation data in negative ionization mode, for example, a CEMS experiment using negative mode ESI that allows for the intact characterization of glycans without the need to derivatize or desialylate before analysis. Capillary electrophoresis is also ideal for separating the small, polar molecules that are frequent components of the metabolome. Adapting our CEMS interface to allow stable operation in negative mode extends the usefulness of the technology and allows for the sensitive analysis of a wider range of compounds.

Applying negative voltages to an electrospray emitter produces corona discharge at lower magnitudes than in positive mode. To compensate for this, organics are added at higher concentration than positive mode to the sprayed solution, which reduces surface tension and the corona discharge onset potential. In our interface, the emitter solution was replenished by electroosmotic flow; operating the interface in negative ionization mode drives spray solution away from the emitter opening. Capillary action acts to replenish sheath buffer, but this pumping mechanism results in weak, unstable flow. Stable negative mode electrospray was demonstrated only when the separation capillary was coated to reduce forward electroosmotic flow and reduce dilution of the spray buffer. Operating the interface with uncoated capillary rapidly results in discharge onset and destruction of the electrospray emitter due to dilution of the sheath buffer, regardless of the sheath buffer composition. Methanol can be added to the separation background electrolyte to prevent discharge, but this results in unstable electrospray, as shown in the top chart of FIG. 2. In addition, methanol as an electrophoresis additive drastically changes the separation characteristics and conductivity of the separation background electrolyte.

Figure 2:
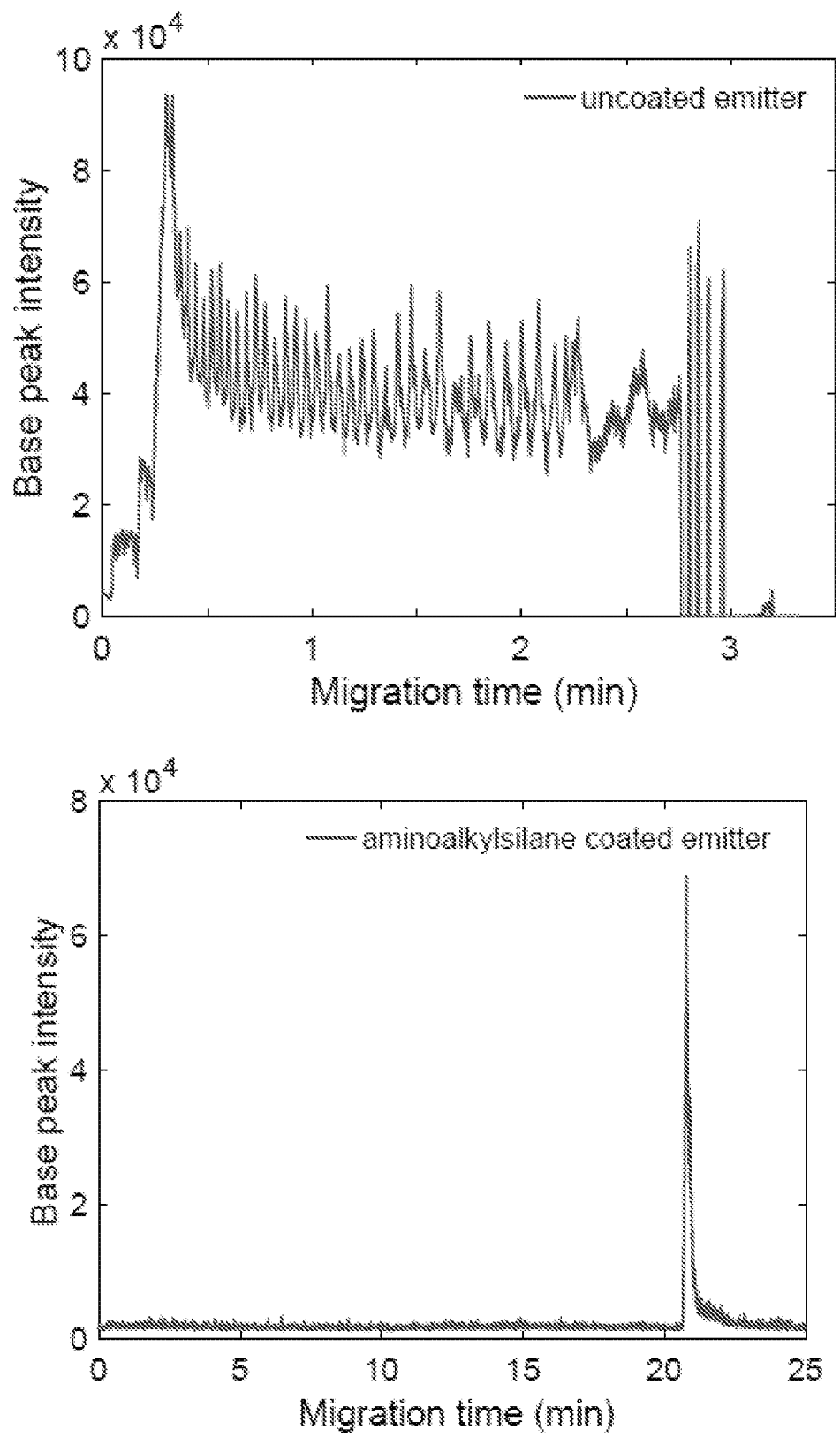
FIG. 2. Base peak electropherogram of negative mode electrospray from an uncoated borosilicate glass emitter filled with an acidic spray buffer to minimize reverse EOF (top electropherogram). The separation background electrolyte contained methanol to prevent immediate discharge. Electrospray was very unstable even with minimized EOF, with rapid oscillation in spray intensity evident. The electrospray does not remain stable enough in this configuration to perform sample analysis. Base peak electropherogram of a phosphocholine sample in negative mode electrospray from an aminoalkylsilane coated borosilicate glass emitter (top electropherogram) shows stable baseline and clear separation of signal to noise.

An uncoated borosilicate glass emitter produces poor electrospray performance in negative polarity because electro-osmotic flow drives sheath electrolyte away from the spray tip opening. FIG. 2 (top chart showing the unstable electropherogram which was terminated after three minutes) presents a base peak electropherogram of the background electrolyte in negative ion mode with an uncoated emitter using a spray electrolyte of 0.1% formic acid in 3:1 methanol:water and a Thermo LTQ mass spectrometer. Even with this acidic spray electrolyte, the electrospray was very unstable, producing large oscillations. These oscillations are likely due to a combination of capillary action, electro-osmotic flow, and electrospray. When negative potential was applied to the electrolyte-filled emitter, an electrospray is formed. During electrospray, the electrospray electrolyte is depleted from the emitter through a combination of electrospray and electro-osmosis. Eventually, the emitter becomes too depleted to maintain electrospray, and the electrospray ceases. Once the electrospray stops, capillary action refills the emitter tip, electrospray is reestablished, and the cycle repeats.

We present an alternative to the previously mentioned workarounds. By modifying the chemistry of the emitter, we can manipulate the electroosmotic flow in the emitter and generate stable negative mode electrospray without modifying the separation background electrolyte or separation capillary. Sensitive analysis in negative ionization mode utilizing already known separation background electrolyte and relatively inexpensive uncoated capillaries is possible when using the modified emitters.

Buffer composition and electrospray emitter opening size are important parameters when performing negative mode electrospray ionization. The discharge onset potential in negative ionization mode is much lower than that in positive ionization mode for the same emitter orifice size. Without appropriate modifications, corona discharge rapidly destroys borosilicate emitters by fusing the tip. Increasing methanol content aids in the production of a stable electrospray by reducing the surface tension of the sheath liquid and reducing the electrospray onset potential. Corona discharge was observed before a stable electrospray could be achieved at any voltage when the sheath buffer contained less than 50 percent by volume methanol. Electrospray emitters with larger than a 25-micron opening also discharged easily, with the stable electrospray onset potential being very close to the corona discharge onset potential.

The pH of the sheath buffer determines the EOF in the emitter. A sheath buffer consisting of 10 mM ammonium acetate in a 3:1 methanol:water mixture in a coated borosilicate emitter with a 15-20 micron opening produces stable negative mode electrospray at applied potentials between −1.0 kV and −1.75 kV, and discharge above −1.75 kV. Ammonium acetate solutions usually have pH around 6.2 when freshly made. Ensuring that the pH of the spray solution is around 6 is important to maximize charge availability for negative mode ionization while not damaging the emitter coating by exposure to basic pH.

Figure 3:
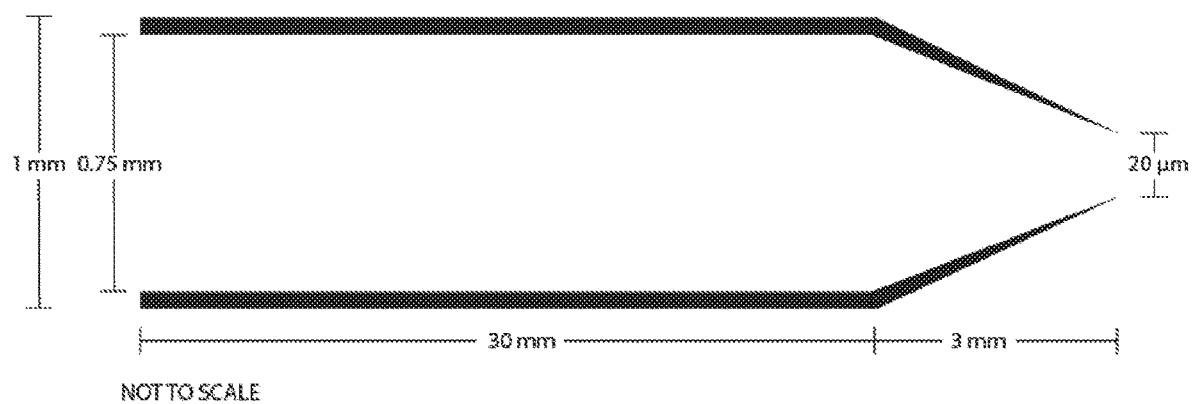
FIG. 3. Schematic of an emitter, according to an embodiment. The cylindrical portion of the emitter remains long relative to the tapered tip to minimize exposure of the coating to heat during the pulling process. By maintaining these dimensions, detrimental effects on EOF in the emitter can be minimized. An advantageous size of the emitter opening is 15 to 20 µm.

In the production of the coated emitter, the tube was first treated with aminopropyltrimethoxysilane. This pre-coated tube was then pulled to a ~20-μm inner diameter orifice. FIG. 3 presents a schematic of the emitter. The conical, pulled portion of the emitter was roughly 2-mm long. This portion of the emitter was heated during pulling, which destroys the aminopropyltrimethoxysilane coating. This portion of the emitter will generate electroosmosis that is directed away from the tip. However, >90% of the emitter's interior surface was not heated during the pulling process, so the unheated aminopropyltrimethoxysilane coating will survive the pulling process, and will generate sufficient electroosmosis towards the emitter orifice.

When the emitter is uncoated, CZE background electrolytes without methanol will dilute the methanol content in the electrospray interface and cause discharge in negative mode, but this is not necessary when the coating is applied. Thus, 1 M acetic acid was chosen as the CZE background electrolyte for all subsequent experiments. Because the coating generates EOF toward the opening of the emitter, spray buffer is not diluted to the same extent as in uncoated emitters and stable electrospray can be maintained without modifying the separation background electrolyte. Production of a stable electrospray even when the separation background electrolyte does not contain methanol is evidence that sufficient EOF was generated to replenish spray buffer in the emitter tip.

Figure 4:
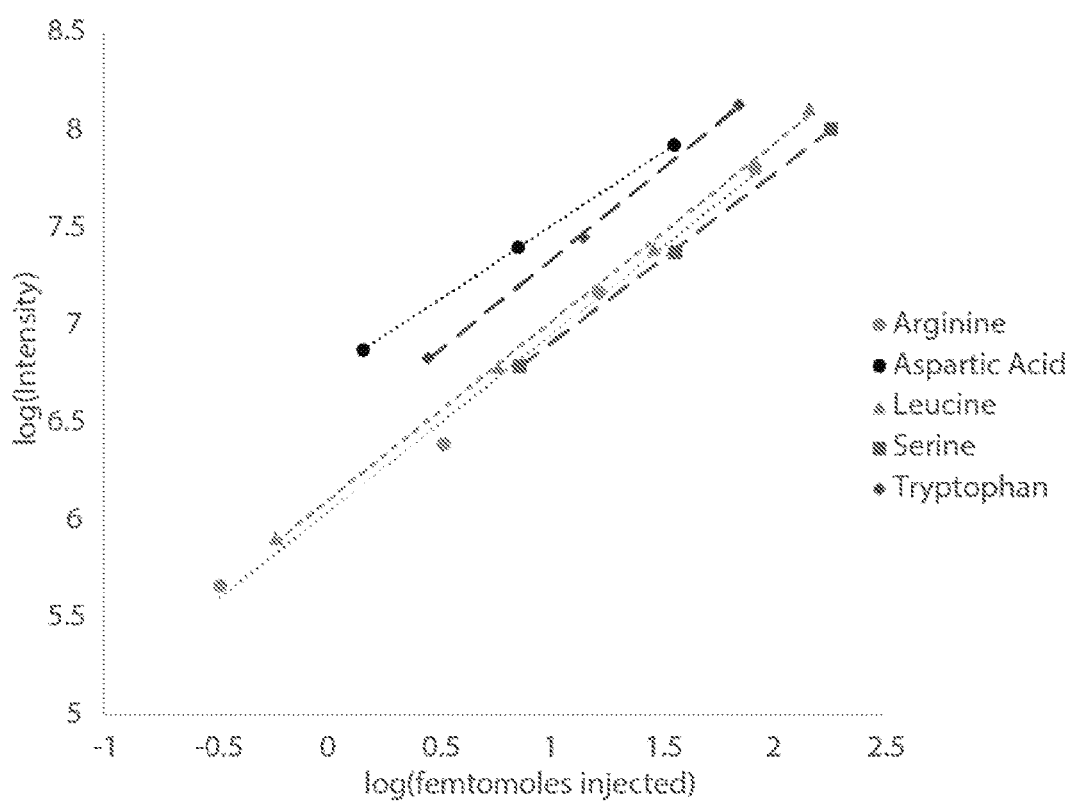
FIG. 4. Calibration curve of five amino acid standards. Calibration was linear for two of the standards across nearly three orders of magnitude. The lowest injection amounts were between 300 and 500 attomoles.

The calibration curves for the five amino acid standards are presented in FIG. 4. Sensitivity for the amino acids varied based on isoelectric point, except for serine. Aspartic acid, the most acidic amino acid in the standard mixture, produced the highest intensity for an equivalent amount injected, while arginine produced the least, besides serine. Intensities for leucine and arginine were linear across three orders of magnitude, while nonlinearity was observed in the 250× dilution for the other three amino acids, and those points were dropped from the calibration. The calibration for arginine and serine remained linear down to 330 and 590 attomoles injected, respectively. The other calibrations remained linear down to 3 to 7 femtomoles injected. Table 1 lists the limits of detection for each amino acid. Limits of detection (LOD) were between 150 and 900 attomoles injected onto the capillary. Previously separated and detected amino acids using HPLC and a Thermo Q-Exactive instrument produced limits of detection for the same amino acids between 1 femtomole and 2.5 picomoles injected in a three-minute separation. Our CE-MS based method improves upon this UPLC-based method with LODs one to three orders of magnitude better in a similar separation time. Our CE-MS method has the added benefit of using relatively inexpensive uncoated capillary.

TABLE 1

Limits of detection of the five amino acids analyzed. Values are reported as attomoles injected onto the capillary. LODs were calculated by measuring signal to noise ratio for each injection performed to construct the calibration curve. LODs were averaged across all injections and concentrations. Error values represent the 95% confidence intervals calculated through the standard deviation.

| Amino Acid | LOD (attomoles injected) |
| --- | --- |
| Serine | 820 ± 140 |
| Arginine | 190 ± 60 |
| Aspartic Acid | 870 ± 110 |
| Leucine | 370 ± 60 |
| Tryptophan | 190 ± 50 |

Figure 5:
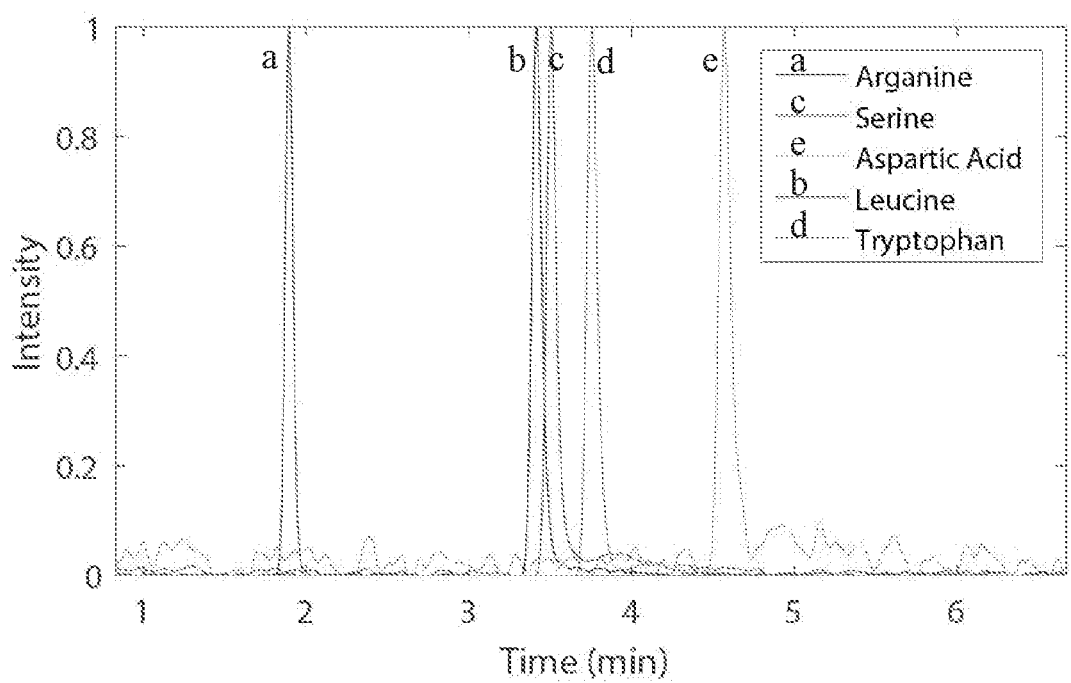
FIG. 5. Extracted ion electropherograms of the five amino acid standards from the 5× dilution. Peak widths (FWHM) were between two and five seconds. Theoretical plate counts were between 15,000 and 20,000.

An extracted ion electropherogram for each of the five standards is presented in FIG. 5. Separation of all the standards was complete in five minutes. Each of the electropherograms demonstrates good peak shape with little or no tailing. Peak widths (FWHM) are between two and five seconds with plate counts between 15,000 and 20,000. Our electrospray interface operating in positive mode produced similar results. The good peak shape and reproducibility of the analysis demonstrates the stability of the interface when a coated emitter was used.

The following Examples are intended to illustrate the above invention and should not be construed as to narrow its scope. One skilled in the art will readily recognize that the Examples suggest many other ways in which the invention could be practiced. It should be understood that numerous variations and modifications may be made while remaining within the scope of the invention.

EXAMPLES

Example 1

Materials

Acetic acid, 3-aminopropyltrimethoxysilane and ammonium acetate were purchased from Sigma-Aldrich (St. Louis, USA). Formic acid (FA), and acetonitrile (ACN) were purchased from Fisher Scientific (Pittsburgh, USA). Methanol was purchased from Honeywell Burdick & Jackson (Wicklow, Ireland). A Nano Pure system from Thermo Scientific (Waltham, Mass.) was used to generate deionized water. Uncoated fused-silica capillaries were purchased from Polymicro Technologies (Phoenix, USA). Emitters were prepared from borosilicate glass capillary (1.0 mm o.d., 0.75 mm i.d., and 10 cm length) from Sutter Instrument Company (Novato USA). All solvents used in the analysis were HPLC and MS grade. Borosilicate glass capillary (1000 OD/750 ID) was from Sutter Instrument Company (Novato USA). Separation capillaries were obtained from Polymicro (Phoenix USA). PEEK sleeves and fittings were purchased from IDEX Corporation (Lake Forest, Ill., USA).

Capillary Zone Electrophoresis-Mass Spectrometry

Experiments were performed using a locally constructed CZE instrument coupled to an electrokinetically-pumped nanoelectrospray interface, FIG. 1, which has been described in detail elsewhere (Sun, L., et al. J. Proteome Res. 14 (2015) 2312-2321). The separation capillary was threaded through a plastic cross into the glass emitter. One side arm of the cross was connected to a reservoir that contains the electrospray sheath electrolyte. The other side arm of the cross was connected to a syringe that was used to flush the interface after installation of the capillary.

The system uses two Spellman CZE-1000R power supplies (Spellman High Voltage Electronics Corporation, Hauppauge, USA) controlled by computer by a LabVIEW program (National Instruments, Austin, USA). One power supply was connected to an injection-end reservoir. The second power supply was connected to the electrospray interface. Electrophoresis is driven by the potential difference between the power supplies. Electrospray is driven by the potential difference between the second power supply and the grounded mass spectrometer inlet.

The background electrolyte (BGE) was 1 M acetic acid in water, and the electrospray solution was 10 mM ammonium acetate in 75% methanol. The pH of the spray solution is typically 6.2. Samples are run in triplicate on a Q-Exactive HF mass spectrometer (Thermo Scientific, Waltham, Mass. USA). Resolution was set to 30,000 (m/z=200), AGC target was 3E6, and the m/z scan window was set to 90-500.

Sample was introduced onto the capillary by pressure injection at 10 psi for 1 second, resulting in an injection volume of ~1 nL. Separation was performed in a 35 cm long uncoated, 150-μm OD, 20-μm ID fused silica capillary using a potential of 26.5 kV (750 V/cm). Electrospray was performed at −1.5 kV.

Preparation of Coated Emitters

The coating process consisted of three steps. First, the borosilicate emitter capillary was pretreated by flushing in series with 0.1 M NaOH for 30 minutes, water until the outflow reached pH 7.0, 0.1 M HCl for 60 minutes, water again until the pH reached 7.0, and finally methanol. The emitter capillary was dried under a nitrogen stream at room temperature prior to coating. The second step of the coating process was to then fill the emitter capillary with a 50% (v/v) solution of 3-aminopropyltrimethoxysilane (APS). Both ends of the emitter capillary were sealed, and the capillary was placed in a water bath at 45° C. for 12 hours. The final step was to thoroughly rinse the emitter capillary with methanol then dry under a room temperature nitrogen stream.

The emitter capillary was then pulled into two tapered-tip emitters by a Sutter P-1000 micropipette puller using the following parameters: heat setting was 475, pull setting was 0, velocity setting was 20, delay was 250, pressure was 550, delay mode was yes, safe heat was yes, and ramp was 490. The ramp parameter was tuned before each pulling session using the ramp test feature. These settings pulled tips with an exit orifice diameter between 15 and 20 μm. The size of the emitter opening was measured with an optical microscope. Note that the tip puller heated the distal end of the emitter capillary, destroying that portion of the coating. However, most of the coating on the emitter was not damaged by the heating, and supports sufficient EOF to generate stable electrospray in negative ion mode.

An emitter tip was inserted into an appropriately sized PEEK sleeve with a nut and ferrule, which was screwed into a 4-way PEEK union. Opposite the emitter, the separation capillary (150 μm OD, 20 μm ID, 35 cm length) was inserted into another PEEK sleeve with a nut and ferrule and screwed into the union. The separation capillary can then be threaded through the union and into the emitter. The other two openings of the union are used to attach a syringe attachment for flushing and to connect a tube leading to the sheath reservoir that was connected to a high-voltage power supply. The emitter apparatus is depicted in FIG. 1.

The bottom chart of FIG. 2 presents a base peak electropherogram of a phosphocholine sample analyzed using a coated emitter. 1,2-Dioleoyl-sn-glycero-3-phosphocholine and 1,2-dipalmitoyl-sn-glycero-3-phosphocholine were purchased as a lyophilized powder and reconstituted in methanol (Sigma-Aldrich, St. Louis, Mo., USA). They were then diluted to 100 μM in 1 M acetic acid for analysis by CEMS. Samples were introduced onto the 60 cm long, 150 μm OD, and 20 μm ID capillary by pressure injection at 10 psi for 4 seconds. A separation voltage of 28 kV (467 V/cm) was applied. −1.4 kV was applied to the electrospray interface. The separation background electrolyte was 75:20:5 water:methanol:acetic acid. A 3-APS coated emitter pulled to a tapered tip with a 20-micron opening was used for ESI. The spray buffer for negative mode ESI was 10 mM ammonium bicarbonate in a 3:1 methanol:water mixture. Mass spectrometry detection was performed on an LTQ XL mass spectrometer (Thermo Scientific, Waltham, Mass. USA) operating in negative ion mode scanning the range 400-2000 m/z.

Amino Acid Calibration Curve

Five amino acids were selected to generate a calibration curve to demonstrate the stability and sensitivity of the interface. The five amino acids were selected based on properties such as isoelectric point and hydrophobicity to be representative of all the amino acids. Stocks were made of each amino acid in MS grade water, then diluted to running concentration in separation background electrolyte. Concentrations of the initial mixture of standards are listed in Table 2.

TABLE 2

Concentrations of the initial standard mixture from which all serial dilutions were made. The mixture was run at 1×, 5×, 25× and 250× dilutions to construct the calibration curve.

| Amino Acid | Initial Concentration (μM) |
|---|---|
| Serine | 190 |
| Arginine | 86 |
| Aspartic Acid | 38 |
| Leucine | 150 |
| Tryptophan | 75 |

The separation background electrolyte was 1 M acetic acid and the electrospray buffer was 10 mM ammonium acetate in 75% methanol. pH of the spray buffer was 6.2. Serial dilutions of the standard mixture were made at 5×, 25× and 250× to generate a calibration curve. Samples were run in triplicate on a Q-Exactive HF mass spectrometer (Thermo 5 Scientific, Waltham, Mass. USA). Resolution was set to 30,000, AGC target was 3E6, and the m/z scan window was set to be 90-500. Sample was introduced onto the capillary by pressure injection at 10 psi for 1 second, resulting in an injection volume of 1 nL. Separation was performed at 26.5 kV (750 V/cm) and electrospray was performed at −1.5 kV. Thermo RAW files were converted to mzXML by MSconvert. The data were analyzed in MATLAB (Mathworks Inc., Natick, Mass., USA). Electropherograms were extracted with 5 ppm tolerance of the target mass. They were then subjected to Lowess filtering, Gaussian convolution and baseline adjustment. The maximum intensity of the peak corresponding to each standard was used to construct the calibration curve.

Embryo Collection and Metabolite Extraction

All animal procedures were performed according to the protocols approved by the University of Notre Dame Institutional Animal Care and Use. *Xenopus laevis* embryos were fertilized, collected, and processed using published protocols (Peuchen et al., *Anal. Bioanal. Chem.* 408 (2016) 4743-4749). Embryos were collected at development stage 1. The embryos were placed in an Eppendorf tube with 55 μL of 2:2:1 acetonitrile:water:methanol per embryo. The mixture was first triturated using a pipetter, and then vortexed to liberate small molecule metabolites. The tubes were centrifuged and the supernatant was removed, clarified, and flash frozen in liquid nitrogen. Extracts were stored at −80° C. until directly analyzed by CZE-MS (FIG. 6).

Data Analysis

Thermo RAW files were converted to mzXML by MSconvert. The data were imported into MATLAB (MathWorks, Natick, Mass. USA) for further analysis.

Summary

Coating ESI emitters with aminopropyltrimethoxysilane reverses the direction of EOF in the emitter and allows for the construction of an electrokinetically driven sheath flow negative polarity ESI interface for CZE-MS. This interface has been successfully applied for the analysis of amino acid standards. The stability and sensitivity of the electrokinetically driven interface for negative mode ESI was demonstrated across three orders of magnitude, and limits of detection were between 150 and 900 attomoles injected for a five-minute separation, a significant improvement over comparable HPLC methods. Forward EOF is maintained in the electrospray emitters allowing the use of separation background electrolyte that do not contain organic additives. The electrokinetically driven sheath flow interface for CZE coupled to negative mode ESI allows for independent optimization of separation background electrolytes and electrospray buffers without the decrease in sensitivity caused by pumping electrospray buffer at high flow rates in traditional mechanically pumped sheath flow interfaces.

While specific embodiments have been described above with reference to the disclosed embodiments and examples, such embodiments are only illustrative and do not limit the scope of the invention. Changes and modifications can be made in accordance with ordinary skill in the art without departing from the invention in its broader aspects as defined in the following claims.

All publications, patents, and patent documents are incorporated by reference herein, as though individually incorporated by reference. No limitations inconsistent with this disclosure are to be understood therefrom. The invention has been described with reference to various specific and preferred embodiments and techniques. However, it should be understood that many variations and modifications may be made while remaining within the spirit and scope of the invention.

What is claimed is:

1. An electrospray ionization interface for a mass spectrometer comprising:
    a glass emitter for electroosmotic flow (EOF) of a sheath-liquid in negative mode, wherein the glass emitter's surface comprises a coating of one or more organic chemicals covalently bonded to the surface wherein the organic chemicals comprise one or more functional moieties;
    a separation capillary disposed inside the emitter; and
    an inlet for a sheath liquid;
    wherein the glass emitter is a hollow cylinder comprising an orifice at a distal end and the inner diameter of the orifice is smaller than the inner diameter of the hollow cylinder's body; wherein the functional moieties are positively charged and the positively charged functional moieties stabilize the direction of the EOF, wherein the EOF of the sheath liquid traverses in a direction toward the orifice and an ionized electrospray is formed as the sheath liquid exits the orifice.

2. The interface of claim 1 wherein a less than whole portion of the glass emitter comprises the functional moieties.

3. The interface of claim 1 wherein the separation capillary comprises a separation background electrolyte wherein one or more analytes in a mixture of the separation background electrolyte are separated in the capillary and the analytes exiting the capillary are transported toward the orifice by the EOF of the sheath liquid around the distal tip of the separation capillary.

4. The interface of claim 1 wherein the inner diameter of the glass emitter orifice is about 10 μm to about 25 μm.

5. The interface of claim 1 wherein the functional groups are positively charged organoamines and the organoamines substantially prevent EOF in the direction opposite to the emitter orifice thereby minimizing fluctuations in electrospray intensity.

6. The interface of claim 5 wherein the organoamines are positively charged aminoalkylsilanes and the aminoalkylsilanes minimize fluctuations in electrospray intensity of the ionized electrospray exiting the glass emitter and afford a limit of detection of an analyte below 1 femtomole.

7. The interface of claim 6 wherein the separation capillary is recessed behind the orifice and the limit of detection of an analyte is about 150 to about 900 attomoles.

8. An emitter for an electrospray ionization-mass spectrometer (ESI-MS) comprising:
   a hollow cylinder having an orifice at a distal end, wherein the inner diameter of the orifice is smaller than the inner diameter of the cylinder body and the surface of the emitter comprises a coating of one or more organic chemicals covalently bonded to the surface wherein the organic chemicals comprise one or more functional moieties;
   a separation capillary disposed inside the emitter; and
   a union to the emitter and an inlet for a sheath liquid;
   wherein the functional moieties are positively charged and the positively charged functional moieties stabilize the direction of electroosmotic flow (EOF) of the sheath liquid toward the orifice.

9. The emitter of claim 8 wherein the emitter comprises borosilicate glass coated partially by the one or more of the functional moieties.

10. The emitter of claim 8 wherein about 10% to about 90% of the surface emitter is coated by one or more of the functional moieties.

11. The emitter of claim 8 wherein the organic chemicals covalently bonded to the surface of the emitter comprise an organoamine.

12. The emitter of claim 8 wherein the inner diameter of the emitter orifice is about 5 µm to about 30 µm.

13. The emitter of claim 8 wherein the intensity of ionized electrospray background signal exiting the emitter orifice during use is stabilized to less than about $\pm 2 \times 10^4$ intensity units and the variability of the corresponding electropherogram baseline is reduced by at least a factor of 10.

14. A method for adapting a glass emitter for a negative mode electrospray ionization-mass spectrometer (ESI-MS) comprising:
   covalently bonding organic chemicals having functional moieties to the surface of a glass emitter, wherein the glass emitter is a hollow cylinder comprising an orifice at a distal end and the inner diameter of the orifice is smaller than the inner diameter of the cylinder body; and
   interfacing the glass emitter and a separation capillary to a mass spectrometer, wherein a separation capillary is disposed inside the emitter;
   wherein a mixture of one or more analytes in a separation background electrolyte are separated in the capillary;
   wherein when a negative mode electrospray voltage is applied to a sheath liquid introduced to the emitter, positive charges form on the functional moieties to stabilize the direction of electroosmotic flow (EOF) of the sheath liquid toward the orifice, and the analytes exiting the capillary are transported toward the orifice by the EOF around the distal tip of the capillary, wherein an ionized electrospray is formed as the sheath liquid and the analytes exit the orifice.

15. The method of claim 14 wherein an aminoalkylsilane is covalently bonded to the surface of the glass emitter, and wherein the amino moieties of the aminoalkylsilane are positively charged.

16. The method of claim 14 wherein the inner diameter of the glass emitter orifice is about 10 µm to about 25 µm.

17. The method of claim 16 wherein the stabilized EOF produces a stable electrospray.

18. The method of claim 16 wherein the limit of detection is below about 1 femtomole.

19. An ESI-MS analytical method for analyzing a sample comprising:
   i) interfacing a mass spectrometer to a) the emitter and the sheath liquid inlet of claim 2 and b) the separation capillary wherein a mixture of one or more analytes in a separation background electrolyte are separated in the capillary;
   wherein when a negative mode electrospray voltage is applied to a sheath liquid introduced to the emitter via the inlet, the analytes exiting the capillary are transported toward the orifice by the stable EOF of the sheath liquid around a distal tip of the capillary, thereby producing a stabilized electrospray as the sheath liquid and the analytes exit the orifice and subsequently enter the mass spectrometer; and
   ii) analyzing the sample by mass spectroscopy with a level of detection below about 1 femtomole, thereby determining the presence and relative amount of analyte in the sample.

20. The analytical method of claim 19 wherein analytes in the sample are separated by capillary zone electrophoresis (CZE).

21. The analytical method of claim 20 wherein the sample comprises one or more lipids, one or more carbohydrates, one or more metabolized compounds, or a combination thereof.

22. The analytical method of claim 20 wherein a separation background electrolyte for CZE and the sheath liquid do not contain organic additives.

23. The analytical method of claim 22 wherein high flow rates of the sheath liquid or high flow rates of an electrospray background electrolyte do not substantially decrease the limit of detection.

* * * * *